United States Patent
Nishifukumoto

(10) Patent No.: US 10,476,359 B2
(45) Date of Patent: Nov. 12, 2019

(54) MOTOR ROTOR AND METHOD FOR MANUFACTURING THE SAME

(71) Applicant: FANUC CORPORATION, Yamanashi (JP)

(72) Inventor: Akira Nishifukumoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 8 days.

(21) Appl. No.: 15/420,172

(22) Filed: Jan. 31, 2017

(65) Prior Publication Data

US 2017/0244308 A1 Aug. 24, 2017

(30) Foreign Application Priority Data

Feb. 24, 2016 (JP) ................. 2016-033417

(51) Int. Cl.
| | |
|---|---|
| *H02K 1/27* | (2006.01) |
| *H02K 1/28* | (2006.01) |
| *H02K 15/03* | (2006.01) |
| *H02K 15/12* | (2006.01) |

(52) U.S. Cl.
CPC ........... *H02K 15/03* (2013.01); *H02K 1/2706* (2013.01); *H02K 1/276* (2013.01); *H02K 1/28* (2013.01); *H02K 15/12* (2013.01)

(58) Field of Classification Search
CPC ........ H02K 1/2706; H02K 1/276; H02K 1/28; H02K 15/03; H02K 15/12
USPC ................. 310/43, 60 A, 61, 156.53, 156.56
See application file for complete search history.

(56) References Cited

U.S. PATENT DOCUMENTS

| | | | | |
|---|---|---|---|---|
| 3,401,280 | A * | 9/1968 | Lackey | H02K 17/165 29/598 |
| 3,902,087 | A * | 8/1975 | Hakamada | C08G 18/003 310/211 |
| 4,796,353 | A * | 1/1989 | Mantovani | H02K 7/16 29/596 |

(Continued)

FOREIGN PATENT DOCUMENTS

| | | |
|---|---|---|
| CN | 202488239 U | 10/2012 |
| CN | 104704721 A | 6/2015 |

(Continued)

OTHER PUBLICATIONS

English Abstract and Machine Translation for Japanese Publication No. 2014-014271 A, published Jan. 23, 2014, 20 pgs.

(Continued)

*Primary Examiner* — John K Kim
(74) *Attorney, Agent, or Firm* — Fredrikson & Byron, P.A.

(57) ABSTRACT

Provided is a motor rotor comprising a rotor core having a plurality of punched holes, a plurality of magnets placed on an outer circumferential surface of the rotor core or placed inside the rotor core, and a resin for fixing the plurality of magnets to the rotor core, wherein in plan view, each of the punched holes has at least one first inner surface section which coincides with an arc of a perfect circle and at least one second inner surface section which does not coincide with any arc of the perfect circle and, in plan view, the second inner surface section extends from one end point of an arc subtending a central angle smaller than 180° in the perfect circle to the other end point of the arc by passing outside the perfect circle.

4 Claims, 7 Drawing Sheets

(56) References Cited

U.S. PATENT DOCUMENTS

| | | | |
|---|---|---|---|
| 6,995,484 B1* | 2/2006 | Heimann | B22D 19/0054 310/211 |
| 7,239,057 B2* | 7/2007 | Han | H02K 16/02 310/114 |
| 7,705,503 B2* | 4/2010 | Takahashi | H02K 1/32 310/156.53 |
| 9,178,394 B2* | 11/2015 | Asahi | H02K 1/04 |
| 9,973,047 B2* | 5/2018 | Lacroix | H02K 1/2766 |
| 9,985,507 B2* | 5/2018 | Nakano | H02K 29/03 |
| 10,063,115 B2* | 8/2018 | Ichien | H02K 1/2773 |
| 2004/0174083 A1* | 9/2004 | Han | H02K 16/02 310/156.12 |
| 2007/0052313 A1* | 3/2007 | Takahashi | H02K 1/2766 310/156.53 |
| 2009/0045689 A1* | 2/2009 | Haruno | H02K 1/276 310/156.56 |
| 2010/0011807 A1* | 1/2010 | Nam | F01C 21/0863 62/510 |
| 2010/0019598 A1* | 1/2010 | Saban | H02K 1/02 310/156.12 |
| 2012/0104891 A1* | 5/2012 | Yamaguchi | H02K 1/276 310/156.53 |
| 2015/0280500 A1* | 10/2015 | Nigo | H02K 21/16 310/156.53 |
| 2015/0303752 A1 | 10/2015 | Siebald | |
| 2015/0357879 A1* | 12/2015 | Radwainski | H02K 7/04 310/51 |
| 2016/0261158 A1* | 9/2016 | Horii | H02K 1/32 |
| 2017/0244308 A1* | 8/2017 | Nishifukumoto | H02K 1/276 |

FOREIGN PATENT DOCUMENTS

| | | |
|---|---|---|
| CN | 204992833 U | 1/2016 |
| CN | 204992841 U | 1/2016 |
| DE | 2014616 A | 10/1971 |
| DE | 8523309 U1 | 6/1986 |
| JP | 2002247784 A | 8/2002 |
| JP | 2005210795 A | 8/2005 |
| JP | 2007104888 A | 4/2007 |
| JP | 2007159245 A | 6/2007 |
| JP | 200822601 A | 1/2008 |
| JP | 2009100634 A | 5/2009 |
| JP | 2010119260 A | 5/2010 |
| JP | 201414271 A | 1/2014 |
| WO | 02097952 A1 | 12/2002 |

OTHER PUBLICATIONS

English Abstract and Machine Translation for Japanese Publication No. 2009-100634 A, published May 7, 2009, 7 pgs.

English Abstract and Machine Translation for Japanese Publication No. 2008-022601 A, published Jan. 31, 2008, 12 pgs.

English Abstract and Machine Translation for Japanese Publication No. 2007-104888 A, published Apr. 19, 2007, 21 pgs.

English Abstract and Machine Translation for Japanese Publication No. 2005-210795 A, published Aug. 4, 2005, 12 pgs.

Untranslated Decision to Grant a Patent mailed by Japan Patent Office (JPO) for Application No. JP 2016-033417, dated Jan. 25, 2018, 3 pages.

English machine translation of Decision to Grant a Patent mailed by Japan Patent Office (JPO) for Application No. JP 2016-033417, dated Jan. 25, 2018, 3 pages.

English Abstract and Machine Translation for Japanese Publication No. 2007-159245 A, published Jun. 21, 2007, 11 pgs.

English Abstract and Machine Translation for Japanese Publication No. 2002-247784 A, published Aug. 30, 2002, 13 pgs.

English Machine Translation for Japanese Publication No. 2010-119260 A, published May 27, 2010, 16 pgs.

English Abstract and Machine Translation for German Publication No. DE 2014616 A, published Oct. 14, 1971, 6 pgs.

English Abstract and Machine Translation for International Publication No. WO 02/097952 A1, published Dec. 5, 2002, 8 pgs.

English Abstract and Machine Translation for German Publication No. DE 8523309 U1, published Jun. 12, 1986, 3 pgs.

English Abstract and Machine Translation for Chinese Publication No. 104704721 A, published Jun. 10, 2015, 10 pgs.

English Abstract and Machine Translation for Chinese Publication No. 202488239 U, published Oct. 10, 2012, 4 pgs.

English Abstract and Machine Translation for Chinese Publication No. 204992833 U, published Jan. 20, 2016, 7 pgs.

English Abstract for Chinese Publication No. 204992841 U, published Jan. 20, 2016, 1 pg.

* cited by examiner

MOTOR ROTOR AND METHOD FOR MANUFACTURING THE SAME

BACKGROUND OF THE INVENTION

1. Field of the Invention

The present invention relates to a motor rotor and a method for manufacturing the same.

2. Description of the Related Art

The rotor of an electric motor (for example, a synchronous motor) includes a rotor core constituting a yoke and permanent magnets held on the outer circumferential surface of the rotor core or held inside the rotor core. Known methods for fixing the thus arranged permanent magnets to the rotor core include, for example, a method that uses an adhesive and a method that injects a molten resin by an injection molding machine and then curing the resin.

When the prior known resin injection magnet fixing method is employed, there is concern that a portion of the rotor core may be deformed due to an extremely high injection pressure. A method for suppressing such deformation of the rotor core at the time of resin injection is known, for example, in the following patent documents.

In Japanese Unexamined Patent Publication No. 2007-159245, there is described a method in which a member for suppressing deformation of the rotor core is provided in a recessed portion of an injection molding die and the member is butted against the rotor core to support the strength of the rotor core.

In Japanese Unexamined Patent Publication No. 2002-247784, there is described a method in which, in a magnet embedded rotor, a space is left on the rotor shaft side of a permanent magnet and a resin material is injected into the space thereby alleviating the pressing force exerted on a laminated iron core.

SUMMARY OF THE INVENTION

On the other hand, it is known to provide a structure in which punched holes for reducing the moment of inertia of the rotor are formed in order to enhance the acceleration performance of an electric motor. FIGS. 6 and 7 are plan views showing portions of prior art motor rotors 6 and 7, respectively. In many cases, the punched holes 65, 75 are each formed in the shape of a perfect circle, as shown in FIGS. 6 and 7. When fixing the permanent magnets 61, 71 to the rotor core 60, 70 having the perfect circular shaped punched holes 65, 75 by using a resin 62, 72, a perfect circular shaped pin as a member for suppressing deformation of the rotor core 60, 70 is inserted into each punched hole 65, 75.

However, there are cases where complex shapes, optimized from the viewpoint of the moment of inertia of the rotor, the amount of magnetic flux passing through the interior of the rotor core, or the strength of the rotor core, are employed for the punched holes. FIGS. 8 and 9 are plan views showing prior art motor rotors 8 and 9 having complex shaped punched holes 85 and 95, respectively. As shown in FIG. 8, when inserting deformation suppressing members (pins) 89 conforming to the complex shapes of the punched holes 85 into the respective punched holes 85, strict dimensional and positional tolerances are required for the deformation suppressing members 89 so that every deformation suppressing member 89 can be fitted into every one of the plurality of punched holes 85. There has therefore been the problem that not only does the cost of manufacturing equipment increase, but also the work efficiency degrades.

On the other hand, as shown in FIG. 9, when a perfect circular shaped deformation suppressing member (pin) 99 is inserted into each complex shaped punched hole 95, the deformation suppressing member 99 contacts the punched hole 95 to form line contacts in regions A. As a result, the injection pressure is concentrated on these line contact portions, and therefore, it has not been possible to obtain a sufficient deformation suppressing effect. Furthermore, since there occurs a region such as a region B where the deformation suppressing member 99 does not contact a side wall 95a of the punched hole 95, the deformation suppressing member 99 is allowed to move therein, and therefore, it has not been possible to provide sufficient support strength.

Accordingly, there is a need for techniques that can suppress deformation of a rotor core at the time of resin injection while achieving quicker acceleration of a motor rotor with the provision of complex shaped punched holes, without increasing the cost of manufacturing equipment and without degrading the work efficiency.

According to a first mode of the present invention, there is provided a motor rotor comprising a rotor core having a plurality of punched holes, a plurality of magnets placed on an outer circumferential surface of the rotor core or placed inside the rotor core, and a resin for fixing the plurality of magnets to the rotor core, wherein in plan view, each of the punched holes has at least one first inner surface section which coincides with an arc of a perfect circle and at least one second inner surface section which does not coincide with any arc of the perfect circle and, in plan view, the second inner surface section extends from one end point of an arc subtending a central angle smaller than 180° in the perfect circle to the other end point of the arc by passing outside the perfect circle.

According to a second mode of the present invention, which is a modification of the first mode, there is provided a motor rotor, wherein in plan view, the first inner surface section coincides with an arc subtending a central angle larger than 180° in the perfect circle.

According to a third mode of the present invention, which is a modification of the first mode, there is provided a motor rotor, wherein there are at least two first inner surface sections, and the two first inner surface sections are disposed circumferentially or radially opposite each other about an axis of the rotor.

According to a fourth mode of the present invention, which is a modification of the first mode, there is provided a motor rotor, wherein there are at least three first inner surface sections, and in plan view, the three first inner surface sections coincide with arcs each of which is located within one of three ranges defined by dividing the perfect circle into three equal parts about a center thereof.

According to a fifth mode of the present invention, which is a modification of the first mode, there is provided a motor rotor, wherein the first inner surface section is located in a region opposing the magnet.

According to a sixth mode of the present invention, there is provided a method for manufacturing a motor rotor comprising a rotor core having a plurality of punched holes, a plurality of magnets placed on an outer circumferential surface of the rotor core or placed inside the rotor core, and a resin for fixing the plurality of magnets to the rotor core, the method comprising the steps of: forming the rotor core having the plurality of punched holes so that in plan view, each of the punched holes has at least one first inner surface section which coincides with an arc of a perfect circle and at least one second inner surface section which does not coincide with any arc of the perfect circle and, in plan view, the second inner surface section extends from one end point of an arc subtending a central angle smaller than 180° in the perfect circle to the other end point of the arc by passing outside the perfect circle; placing the plurality of magnets on the outer circumferential surface of the rotor core or inside the rotor core; placing the rotor core on a die plate by inserting a plurality of perfect circular cylindrical members into the plurality of punched holes so that the first inner surface section of each of the plurality of punched holes is in surface contact with a side surface section of a corresponding one of the plurality of perfect circular cylindrical members; and injecting the resin into the die plate so that the plurality of magnets are fixed to the rotor core by the resin.

DETAILED DESCRIPTION

Figure 1:
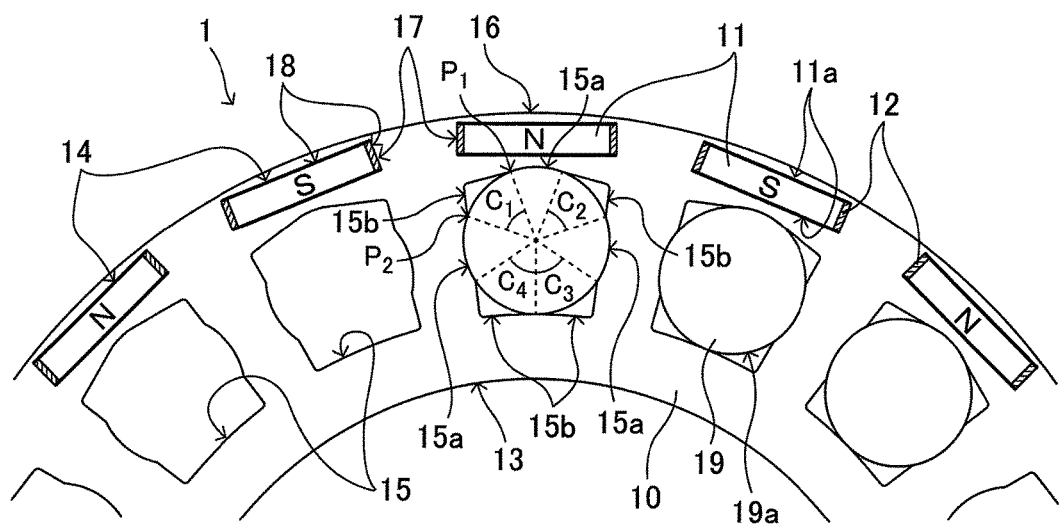
FIG. 1 is a plan view showing a portion of a motor rotor according to one embodiment of the present invention.

Embodiments of the present invention will be described in detail below with reference to the accompanying drawings. Throughout the drawings, like component elements are designated by like reference numerals. It will also be noted that the description given herein does not restrict the technical scope of the invention described in the appended claims or the meaning, etc. of any term given therein.

Referring to FIG. 1, one embodiment of the present invention will be described. FIG. 1 is a plan view showing a portion of a motor rotor 1 according to the present embodiment. The motor rotor 1 of the present embodiment comprises a rotor core 10, a plurality of permanent magnets 11 placed inside the rotor core 10, and a resin 12 for fixing the permanent magnets 11 to the rotor core 10. These component elements will be described below.

The rotor core 10 is a cylindrical member constructed from a lamination of thin magnetic plates such as silicon steel plates. The rotor core 10 includes a plurality of magnet holding recesses 14 formed at equally spaced intervals along a circumferential direction and arranged so as to surround an axis hole 13 and located near an outer circumferential surface 16 of the rotor core 10 when viewed in a radial direction, and a plurality of punched holes 15 located radially inwardly of the magnet holding recesses 14. Each magnet holding recess 14 is substantially rectangular in shape in plan view, and has a pair of grooves 17 on opposite sides across a longitudinal direction thereof. The pair of grooves 17 are used when injecting the resin 12. The magnet holding recesses 14 hold the respective permanent magnets 11 in the axial direction of the rotor 1.

The permanent magnets 11 are flat plate magnets each magnetized in the thickness direction. A pair of principal surfaces 11a in the thickness direction form N and S poles, respectively. The permanent magnets 11 adjacent to each other in the circumferential direction are arranged so that opposite magnetic poles face the outer circumferential surface 16. A space 18 including the grooves 17 is formed between the permanent magnet 11 and its magnet holding recess 14. The space 18 is filled with the resin 12.

Figure 2:
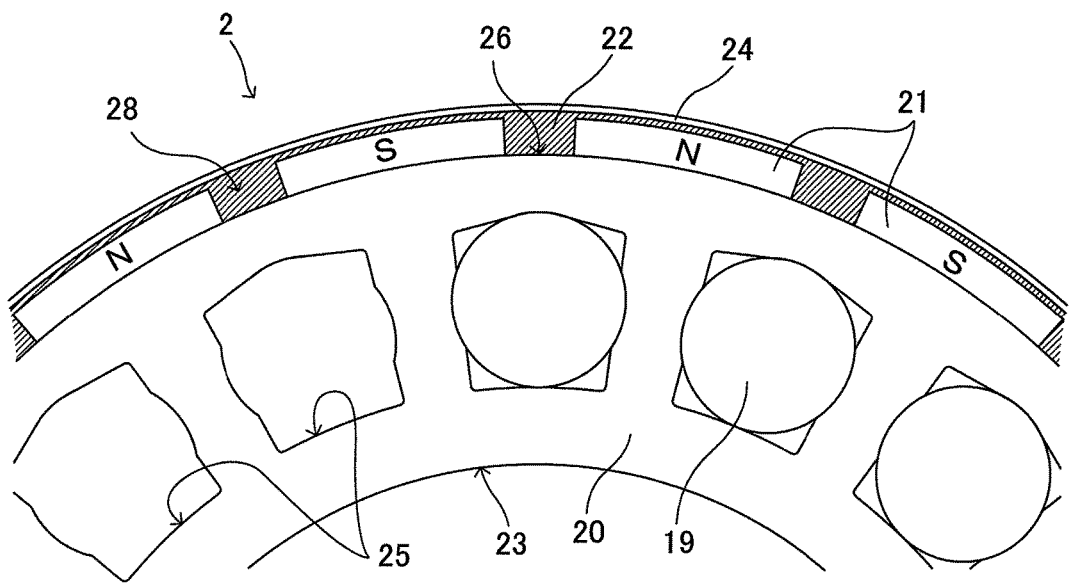
FIG. 2 is a plan view showing a portion of a motor rotor according to another embodiment of the present invention.

In another embodiment, the permanent magnets are held on the outer circumferential surface of the rotor core. FIG. 2 is a plan view showing a portion of a motor rotor 2 according to this other embodiment. The motor rotor 2 is similar to the motor rotor 1 shown in FIG. 1, but differs in that the plurality of permanent magnets 21 are arranged on the outer circumferential surface 26 of the rotor core 20. The permanent magnets 21 are fan-shaped flat plate magnets. The plurality of permanent magnets 21 are arranged on the outer circumferential surface 26 of the rotor core 20 at equally spaced intervals along the circumferential direction so as to surround the axis of the rotor 2. A protective tube 24 for protecting the permanent magnets 21 is provided radially outwardly of the permanent magnets 21. A space 28 is formed between the protective tube 24 and the permanent magnets 21. The space 28 is filled with a resin 22.

Next, the resin 12 of the present embodiment will be described with reference to FIG. 1. The resin 12 is chosen from among engineering plastics having excellent strength and flowability. The resin 12 is injected into the grooves 17 by an injection molding machine not shown, and substantially fills the entire space 18. The resin 12 cures at a prescribed curing temperature and fixes the permanent magnets 11 to the rotor core 10. The punched holes 15 are located radially inwardly of the resin 12 and arranged so as to surround the axis of the rotor 1.

The punched holes 15 are located radially inwardly of the permanent magnets 11 and arranged at equally spaced intervals along the circumferential direction so as to surround the axis of the rotor 1. The punched holes 15 are formed passing through the rotor core 10 in the axial direction of the rotor 1. The punched holes 15 each have a complex shape optimized from the viewpoint of the moment of inertia of the rotor 1, the amount of magnetic flux passing through the interior of the rotor core 10, and the strength of the rotor core 10. In plan view, each punched hole 15 has three first inner surface sections 15a each of which coincides with an arc of a perfect circle 19a, and four second inner surface sections 15b none of which coincide with any arc of the perfect circle 19a.

In the manufacturing process of the rotor 1, the three first inner surface sections 15a respectively coincide with three side surface sections of a perfect circular cylindrical member 19 of a die plate. Since the injection pressure of the resin 12 is supported by the three side surface sections of the perfect circular cylindrical member 19, deformation of the rotor core 10 can be suppressed at the time of resin injection.

In plan view, each of the four second inner surface sections 15b extends from one end point $P_1$ of one of the arcs subtending angles $C_1$ to $C_4$ at the center of the perfect circle 19a to the other end point $P_2$ of the arc by passing outside the perfect circle 19a. The central angles $C_1$ to $C_4$ are not restricted to any particular angle, but are angles smaller than 180°, preferably smaller than 150°, 120°, 90°, 60°, 45°, or 30°. According to this embodiment, since the perfect circular cylindrical member 19 of the die plate is held immobilized within the punched hole 15 during the manufacturing process of the rotor 1, the strength of the rotor core 10 can be supported during the resin injection.

Figure 3A:
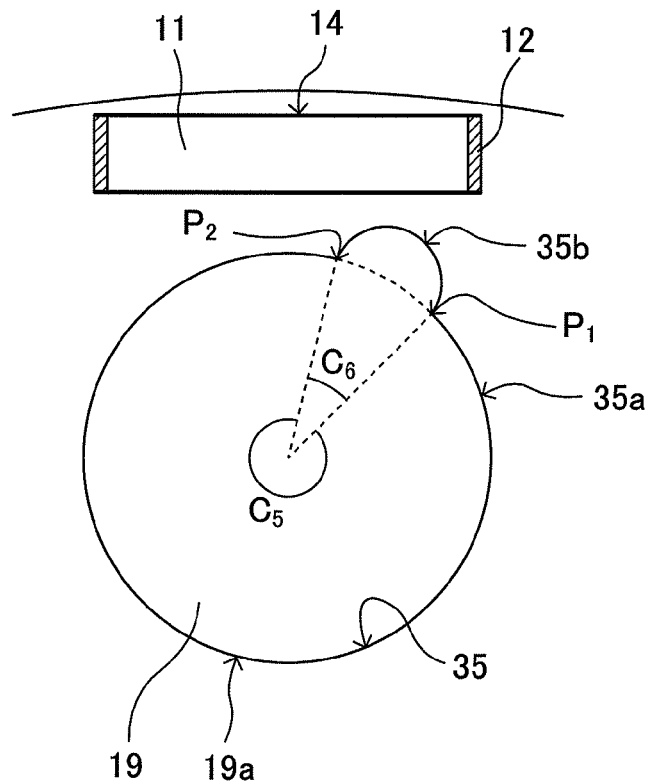
FIG. 3A is a plan view showing a punched hole according to an alternative embodiment of the present invention.

Next, referring to FIGS. 3A to 3D, punched holes according to alternative embodiments will be described. FIG. 3A is a plan view showing a punched hole 35 according to one alternative embodiment. The punched hole 35 has one first inner surface section 35a which coincides with an arc of the perfect circle 19a and one second inner surface section 35b which does not coincide with any arc of the perfect circle 19a.

In plan view, the first inner surface section 35a coincides with an arc subtending an angle $C_5$ at the center of the perfect circle 19a. The central angle $C_5$ is not restricted to any particular angle, but is an angle larger than 180°, preferably larger than 210°, 240°, 270°, 300°, or 330°. According to this alternative embodiment, since the injection pressure of the resin 12 is supported by a larger surface section of the perfect circular cylindrical member 19 of the die plate during the manufacturing process of the rotor, deformation the rotor core can be effectively suppressed at the time of resin injection. Furthermore, since the perfect circular cylindrical member 19 of the die plate is held immobilized within the punched hole 35, the strength of the rotor core can be supported during the resin injection.

In plan view, the second inner surface section 35b extends from one end point $P_1$ of an arc subtending an angle $C_6$ at the center of the perfect circle 19a to the other end point $P_2$ by passing outside the perfect circle 19a. The central angle $C_6$ is not restricted to any particular angle, but is an angle smaller than 180°, preferably smaller than 150°, 120°, 90°, 60°, 45°, or 30°. According to this alternative embodiment, since the perfect circular cylindrical member 19 of the die plate is held immobilized within the punched hole 35 during the manufacturing process of the rotor, the strength of the rotor core can be supported during the resin injection.

Figure 3B:
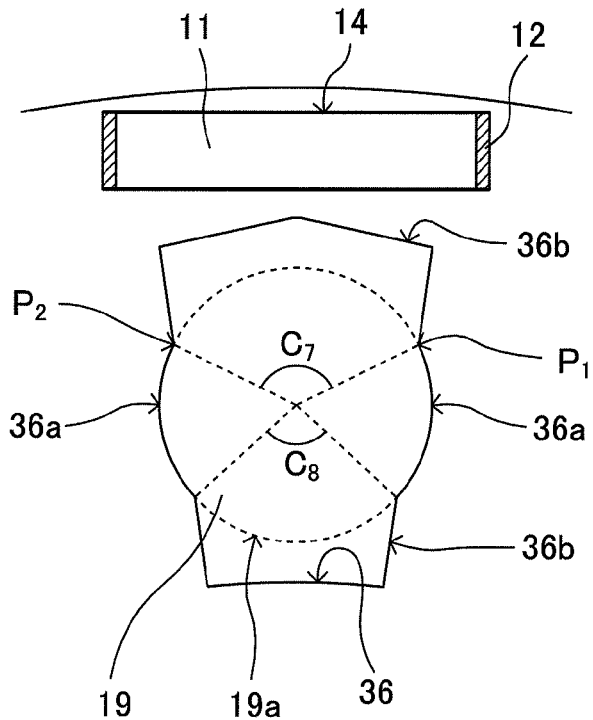
FIG. 3B is a plan view showing a punched hole according to an alternative embodiment of the present invention.

Next, a punched hole 36 will be described with reference to FIG. 3B. FIG. 3B is a plan view showing the punched hole 36 according to another alternative embodiment. The punched hole 36 has two first inner surface sections 36a each of which coincides with an arc of the perfect circle 19a, and two second inner surface sections 36b neither of which coincides with any arc of the perfect circle 19a.

The two first inner surface sections 36a are disposed circumferentially opposite each other about the axis of the rotor. In the manufacturing process of the rotor, since the two first inner surface sections 36a respectively coincide with two side surface sections of the perfect circular cylindrical member 19 of the die plate, the injection pressure of the resin 12 can be supported in the circumferential direction by the two side surface sections of the perfect circular cylindrical member 19.

In plan view, each of the two second inner surface sections 36b extends from one end point $P_1$ of one of the arcs subtending angles $C_7$ and $C_8$ at the center of the perfect circle 19a to the other end point $P_2$ by passing outside the perfect circle 19a. The central angles $C_7$ and $C_8$ are not restricted to any particular angle, but are angles smaller than 180°, preferably smaller than 150°, 120°, 90°, 60°, 45°, or 30°. According to this alternative embodiment, since the perfect circular cylindrical member 19 of the die plate is held immobilized within the punched hole 36 during the manufacturing process of the rotor, the strength of the rotor core can be supported during the resin injection.

Figure 3C:
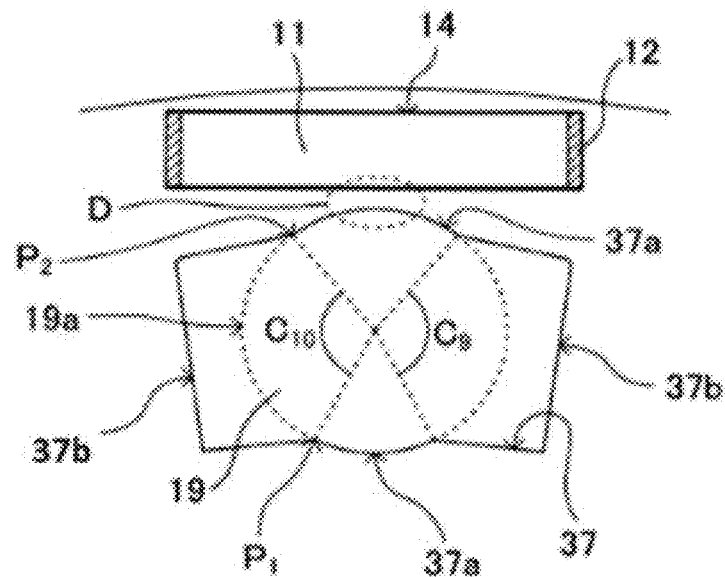
FIG. 3C is a plan view showing a punched hole according to an alternative embodiment of the present invention.

Next, a punched hole 37 will be described with reference to FIG. 3C. FIG. 3C is a plan view showing the punched hole 37 according to another alternative embodiment. The punched hole 37 has two first inner surface sections 37a each of which coincides with an arc of the perfect circle 19a, and two second inner surface sections 37b neither of which coincides with any arc of the perfect circle 19a.

The two first inner surface sections 37a are disposed radially opposite each other about the axis of the rotor. In the manufacturing process of the rotor, since the two first inner surface sections 37a respectively coincide with two side surface sections of the perfect circular cylindrical member 19 of the die plate, the injection pressure of the resin 12 can be supported in the radial direction by the two side surface sections of the perfect circular cylindrical member 19.

One of the two first inner surface sections 37a is located in a region D opposing the magnet 11. In the manufacturing process of the rotor, the first inner surface section 37a located in the region D coincides with an arc of the perfect circular cylindrical member 19 of the die plate in the region D. Accordingly, the side surface section of the perfect circular cylindrical member 19 serves to suppress deformation of the rotor core in the region D where the rotor core can easily deform.

In plan view, each of the two second inner surface sections 37b extends from one end point $P_1$ of one of the arcs subtending angles $C_9$ and $C_{10}$ at the center of the perfect circle 19a to the other end point $P_2$ by passing outside the perfect circle 19a. The central angles $C_9$ and $C_{10}$ are not restricted to any particular angle, but are angles smaller than 180°, preferably smaller than 150°, 120°, 90°, 60°, 45°, or 30°. According to this alternative embodiment, since the perfect circular cylindrical member 19 of the die plate is held immobilized within the punched hole 37 during the manufacturing process of the rotor, the strength of the rotor core can be supported during the resin injection.

Figure 3D:
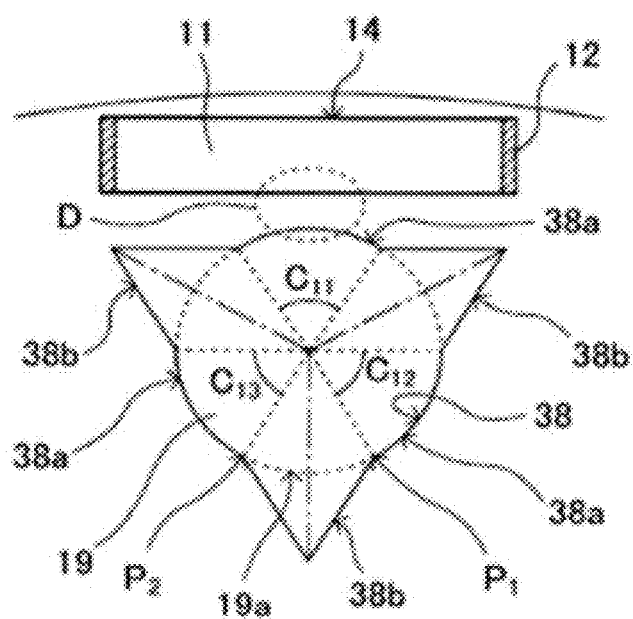
FIG. 3D is a plan view showing a punched hole according to an alternative embodiment of the present invention.

Next, a punched hole 38 will be described with reference to FIG. 3D. FIG. 3D is a plan view showing the punched hole 38 according to another alternative embodiment. The punched hole 38 has three first inner surface sections 38a each of which coincides with an arc of the perfect circle 19a, and three second inner surface sections 38b none of which coincide with any arc of the perfect circle 19a.

In plan view, the three first inner surface sections 38a coincide with arcs each of which is located within one of three ranges defined by dividing the perfect circle 19a into three equal parts about the center thereof. The central angles $C_{11}$ to $C_n$ of the three first inner surface sections 38a are not restricted to any particular angle, but are angles not smaller than 60° but smaller than 120°, preferably not smaller than 70°, 80°, or 90° but smaller than 120°. In the manufacturing process of the rotor, the three first inner surface sections 38a respectively coincide with three side surface sections of the perfect circular cylindrical member 19 of the die plate. Accordingly, the injection pressure of the resin 12 can be supported from three different directions by the three side surface sections of the perfect circular cylindrical member 19.

One of the three first inner surface sections 38a is located in a region D opposing the magnet 11. In the manufacturing process of the rotor, the first inner surface section 38a located in the region D coincides with the side surface section of the perfect circular cylindrical member 19 of the die plate. Accordingly, the side surface section of the perfect circular cylindrical member 19 serves to suppress deformation of the rotor core in the region D where the rotor core can easily deform.

In plan view, each of the three second inner surface sections 38b extends from one end point $P_1$ of one of the arcs subtending an angle smaller than 180° at the center of the perfect circle 19a to the other end point $P_2$ by passing outside the perfect circle 19a. The central angle is not restricted to any particular angle, but is an angle smaller than 180°, preferably smaller than 150°, 120°, 90°, 60°, 45°, or 30°. According to this alternative embodiment, since the perfect circular cylindrical member 19 of the die plate is held immobilized within the punched hole 38 during the manufacturing process of the rotor, the strength of the rotor core can be supported during the resin injection.

Figure 4:
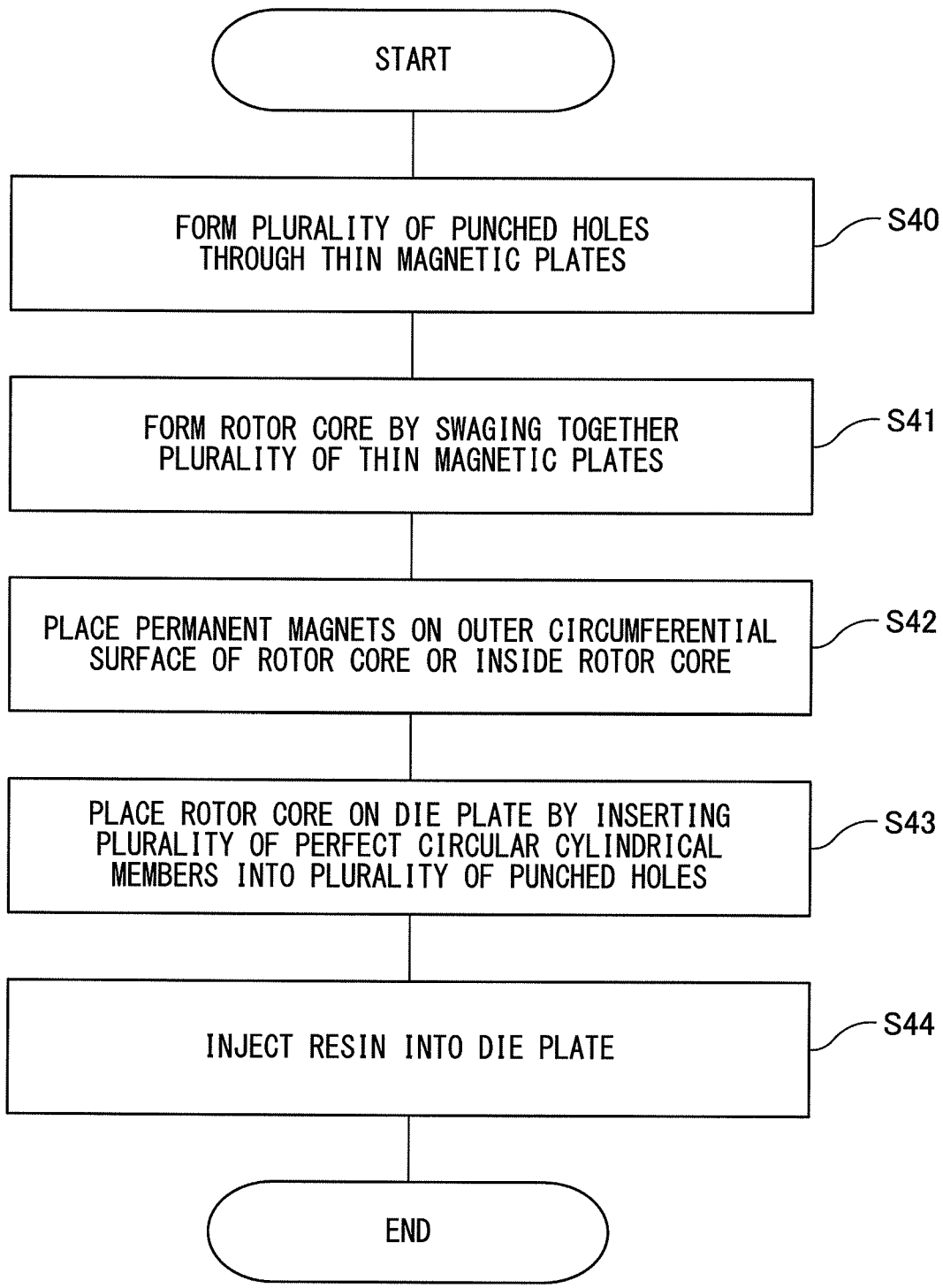
FIG. 4 is a flowchart illustrating a method for manufacturing the motor rotor according to the one embodiment of the present invention.

Next, a method for manufacturing the motor rotor 1 of FIG. 1 will be described with reference to FIG. 4. FIG. 4 is a flowchart illustrating the method for manufacturing the motor rotor 1 according to the present embodiment. The method for manufacturing the motor rotor 1 illustrated here includes a punching step S40, a swaging step S41, a magnet placing step S42, a die plate placing step S43, and a resin injecting step S44.

First, in the punching step S40, a plurality of punched holes 15 are formed through disc-shaped thin magnetic plates. In this example, the punched holes 15 are formed so that, in plan view, each punched hole 15 has three first inner surface sections 15a each of which coincides with an arc of the perfect circle 19a and four second inner surface sections 15b none of which coincide with any arc of the perfect circle 19a. In plan view, each of the four second inner surface sections 15b is formed to extend from one end point $P_1$ of one of the arcs subtending the angles $C_1$ to $C_4$ at the center of the perfect circle 19a to the other end point $P_2$ by passing outside the perfect circle 19a. In the punching step S40, not only the plurality of punched holes 15 but also the axis hole 13 and the plurality of magnet holding recesses 14 are formed in the thin magnetic plates.

Next, in the swaging step S41, the plurality of thin magnetic plates are swaged together to form the rotor core 10. Then, in the magnet placing step S42, the permanent magnets 11 are placed inside the rotor core 10, one in each magnet holding recess 14, in such a manner that the S and N magnetic poles are formed in alternating fashion along the circumferential direction. In another embodiment, the permanent magnets 21 are arranged on the outer circumferential surface of the rotor core 20, as shown in FIG. 2.

Next, in the die plate placing step S43, the rotor core 10 is placed on the die plate not shown. In this example, the plurality of perfect circular cylindrical members 19 are inserted into the plurality of punched holes 15 so that the three first inner surface sections 15a of each of the plurality of punched holes 15 have surface contact with the three side surface sections of one of the plurality of perfect circular cylindrical members 19.

Next, in the resin injecting step S33, the resin 12 is injected into the die plate from the injection molding machine not shown. In this example, the resin 12 is injected with an extremely high injection pressure to substantially fill the entire space 18, but since the injection pressure of the resin 12 is supported by the three side surface sections of the perfect circular cylindrical member 19, deformation of the rotor core 10 can be suppressed at the time of resin injection. Since, in plan view, each of the four second inner surface sections 15b of the punched hole 15 extends from one end point $P_1$ of one of the arcs subtending an angle smaller than 180° at the center of the perfect circle 19a to the other end point $P_2$ by passing outside the perfect circle 19a, the perfect circular cylindrical member 19 is held immobilized within the punched hole 15, and thus the strength of the rotor core 10 can be supported during the resin injection. In the resin injecting step S33, the resin 12 cures at a prescribed temperature. This completes the manufacture of the motor rotor 1 of the present embodiment.

Figure 5A:
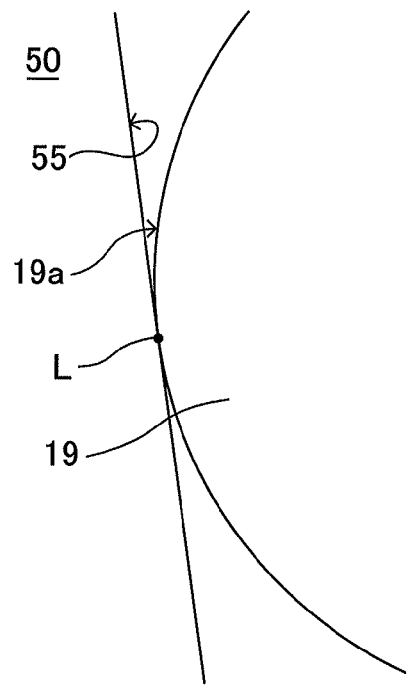
FIG. 5A is an enlarged view showing a contact portion between a complex shaped punched hole and a perfect circular cylindrical member of a die plate according to the prior art.
Figure 5B:
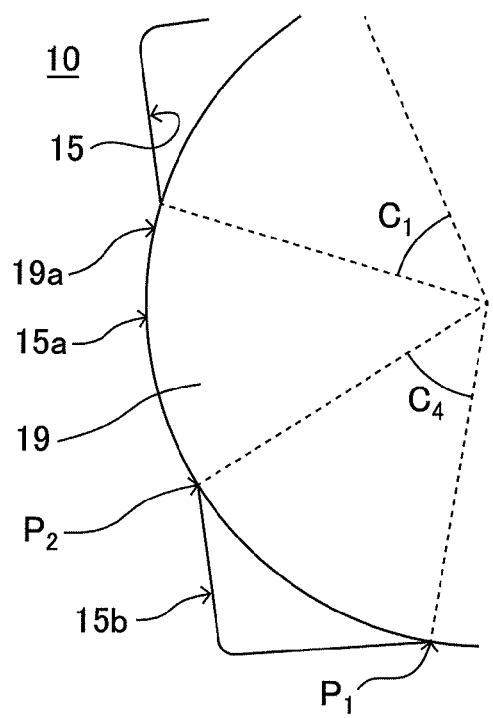
FIG. 5B is an enlarged view showing a contact portion between a complex shaped punched hole and a perfect circular cylindrical member of a die plate according to the one embodiment of the present invention.
Figure 6:
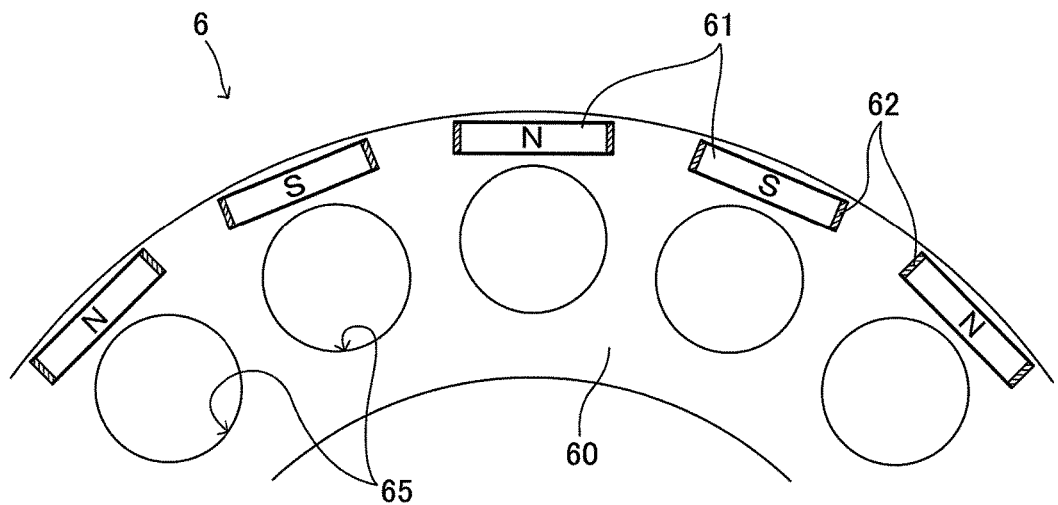
FIG. 6 is a plan view showing a portion of a prior art motor rotor having perfect circular shaped punched holes.
Figure 7:
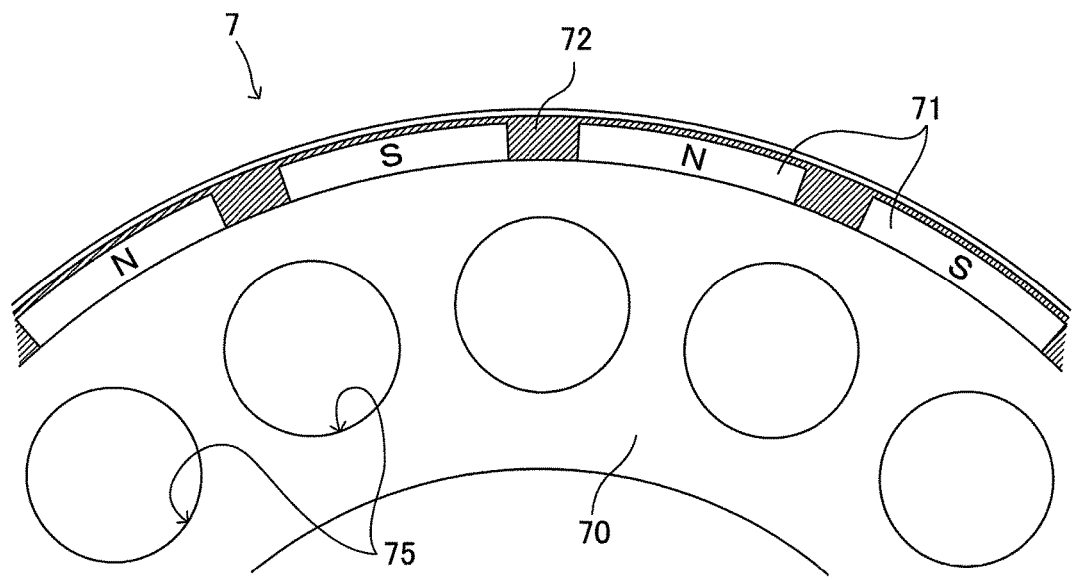
FIG. 7 is a plan view showing a portion of a prior art motor rotor having perfect circular shaped punched holes.
Figure 8:
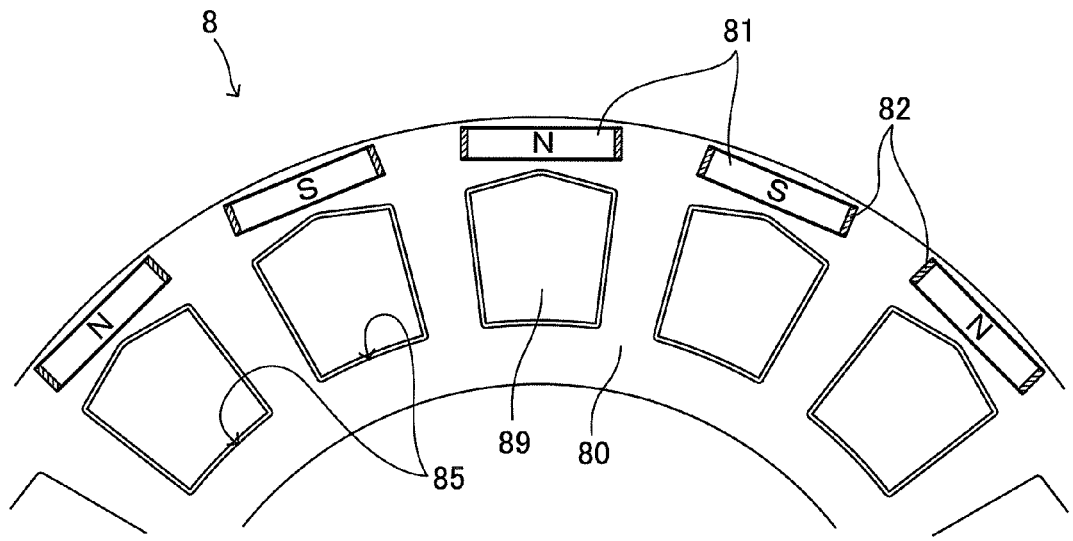
FIG. 8 is a plan view showing a portion of a prior art motor rotor having complex shaped punched holes.
Figure 9:
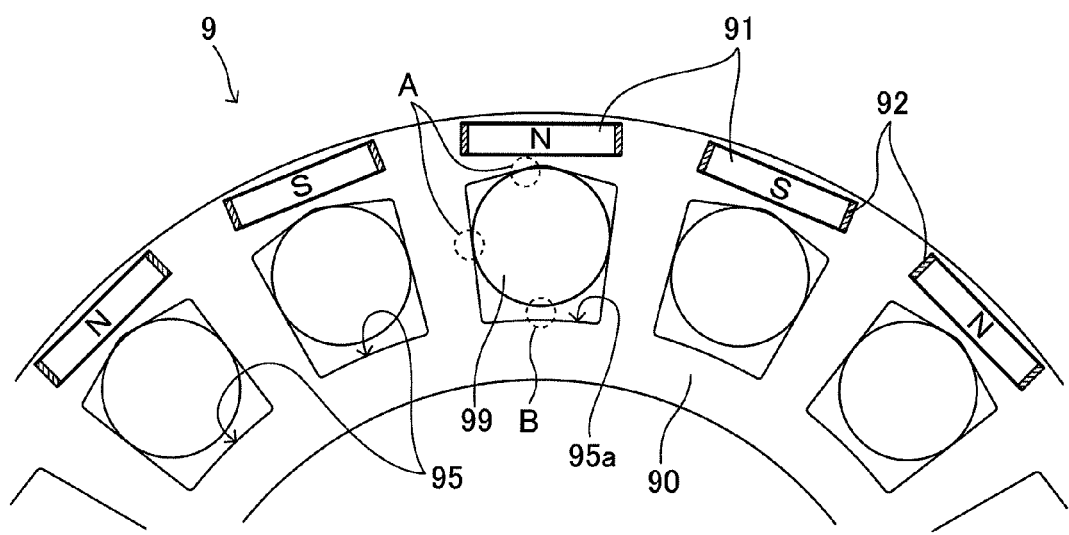
FIG. 9 is a plan view showing a portion of a prior art motor rotor having complex shaped punched holes.

The advantageous effect of the motor rotor 1 of the present embodiment will be described with reference to FIGS. 5A and 5B. FIG. 5A is an enlarged view showing a contact portion between a complex shaped punched hole 55 according to the prior art and the perfect circular cylindrical member 19 of the die plate. FIG. 5B is an enlarged view showing a contact portion between the complex shaped punched hole 15 according to the present embodiment and the perfect circular cylindrical member 19 of the die plate. As shown in FIG. 5A, in the prior art, since the punched hole 55 contacts the side surface of the perfect circular cylindrical member 19 only along a line L, the injection pressure concentrates on the line L, and therefore it has not been possible to sufficiently suppress the deformation of the rotor core 50.

By contrast, as shown in FIG. 5B, the first inner surface section 15a of the punched hole 15 according to the present embodiment coincides with a side surface section of the perfect circular cylindrical member 19 of the die plate. Accordingly, since the injection pressure of the resin 12 is supported by the side surface section of the perfect circular cylindrical member 19, deformation of the rotor core 10 at the time of resin injection can be suppressed. Furthermore, in plan view, each of the second inner surface sections 15b of the punched hole 15 according to the present embodiment extends from one end point $P_1$ of an arc subtending an angle smaller than 180° at the center of the perfect circular cylindrical member 19 to the other end point $P_2$ by passing outside the perfect circle. Since the perfect circular cylindrical member 19 of the die plate is held immobilized within the punched hole 15, the strength of the rotor core 10 can be supported during the resin injection.

In this way, since the perfect circular cylindrical member 19 as the existing deformation suppressing member can be used, it becomes possible to suppress deformation of the rotor core at the time of resin injection while achieving quicker acceleration of the motor rotor 1 with the provision of the complex shaped punched holes 15, without increasing the cost of manufacturing equipment and without degrading the work efficiency.

While the various embodiments have been described above, it will be recognized that the present invention is not limited to the various embodiments described herein, but various alterations may be made without departing from the scope of the present invention as defined by the appended claims.

The invention claimed is:

1. A motor rotor comprising a rotor core having a plurality of punched holes, a plurality of magnets placed on an outer circumferential surface of the rotor core or placed inside the rotor core, and a resin for fixing the plurality of magnets to the rotor core,
wherein in plan view, each of the punched holes has one first inner surface section which coincides with an arc of a perfect circle and one second inner surface section which does not coincide with any arc of the perfect circle and, in plan view, the one second inner surface section extends from one end point of a respective arc subtending a central angle smaller than 180° in the perfect circle to the other end point of the respective arc by passing outside the perfect circle,
wherein in plan view, the one first inner surface section coincides with a respective arc subtending a central angle larger than 180° in the perfect circle,
wherein a portion of the one first inner surface section is located in a region directly across from and facing an adjacently positioned one of the magnets.

2. A motor rotor comprising a rotor core having a plurality of punched holes, a plurality of magnets placed on an outer circumferential surface of the rotor core or placed inside the rotor core, and a resin for fixing the plurality of magnets to the rotor core,
wherein in plan view, each of the punched holes has two first inner surface sections each of which coincides with a respective arc of a same perfect circle and two second inner surface sections which do not coincide with any arc of the perfect circle and, in plan view, each of the two second inner surface sections extends from one end point of a respective arc subtending a central angle smaller than 150° in the perfect circle to the other end point of the respective arc by passing outside the perfect circle, each of the two first inner surface sections extends from one end point to the other end point of a respective arc subtending a central angle greater than 30° in the perfect circle,
wherein the two first inner surface sections of the same perfect circle are disposed circumferentially or radially opposite each other about an axis of the rotor.

3. A motor rotor comprising a rotor core having a plurality of punched holes, a plurality of magnets placed on an outer circumferential surface of the rotor core or placed inside the rotor core, and a resin for fixing the plurality of magnets to the rotor core,
wherein in plan view, each of the punched holes has three first inner surface sections each of which coincides with a respective arc of a same perfect circle and three second inner surface sections which do not coincide with any arc of the perfect circle and, in plan view, each of the three second inner surface sections extends from one end point of a respective arc subtending a central angle smaller than 180° in the perfect circle to the other end point of the respective arc by passing outside the perfect circle, each of the three first inner surface sections extends from one end point to the other end point of a respective arc subtending a central angle greater than 30° in the perfect circle,
wherein in plan view, each of the three first inner surface sections coincides with respective arcs each of which is located within one of three ranges defined by dividing the perfect circle into three equal parts about a center thereof.

4. A method for manufacturing a motor rotor comprising a rotor core having a plurality of punched holes, a plurality of magnets placed on an outer circumferential surface of the rotor core or placed inside the rotor core, and a resin for fixing the plurality of magnets to the rotor core, the method comprising the steps of:
forming the rotor core having the plurality of punched holes so that in plan view, each of the punched holes has one first inner surface section which coincides with an arc of a perfect circle and one second inner surface section which does not coincide with any arc of the perfect circle and, in plan view, the one second inner surface section extends from one end point of a respective arc subtending a central angle smaller than 180° in the perfect circle to the other end point of the respective arc by passing outside the perfect circle, wherein in plan view, the one first inner surface section coincides with a respective arc subtending a central angle larger than 180° in the perfect circle, wherein a portion of the one first inner surface section is located in a region directly across from and facing an adjacently positioned one of the magnets;
placing the plurality of magnets on the outer circumferential surface of the rotor core or inside the rotor core;
placing the rotor core on a die plate by inserting a plurality of perfect circular cylindrical members into the plurality of punched holes so that each of the at least first inner surface sections of each of the plurality of punched holes is in surface contact with a respective side surface section of a corresponding one of the plurality of perfect circular cylindrical members; and
injecting the resin into the die plate so that the plurality of magnets are fixed to the rotor core by the resin.

* * * * *